United States Patent [19]

Schneider et al.

[11] Patent Number: 4,743,576
[45] Date of Patent: May 10, 1988

[54] CATALYST FOR THE PRODUCTION OF SYNTHESIS GAS OR HYDROGEN AND PROCESS FOR THE PRODUCTION OF THE CATALYST

[75] Inventors: Michael Schneider, Ottobrunn-Riemerling; Karel Kochloefl, Moosburg; Ortwin Bock, Landshut-Kumhausen, all of Fed. Rep. of Germany

[73] Assignee: Sud Chemie Aktiengesellschuft, Munich, Fed. Rep. of Germany

[21] Appl. No.: 858,063

[22] Filed: Apr. 30, 1986

Related U.S. Application Data

[63] Continuation-in-part of Ser. No. 665,757, Oct. 29, 1984, Pat. No. 4,613,584.

[30] Foreign Application Priority Data

May 8, 1985 [DE] Fed. Rep. of Germany ....... 3516580

[51] Int. Cl.$^4$ .................. B01J 21/06; B01J 23/02; B01J 23/10; B01J 23/40
[52] U.S. Cl. .................... 502/242; 502/250; 502/303; 502/304; 502/325; 502/339; 252/373; 423/415 A; 423/648 R
[58] Field of Search .............. 502/242, 250, 303, 304, 502/309, 325, 332, 333, 334, 339; 252/373; 423/415 A, 648 R

[56] References Cited

U.S. PATENT DOCUMENTS

| | | | |
|---|---|---|---|
| 3,186,797 | 6/1965 | Pearce et al. | 502/74 X |
| 3,931,053 | 1/1976 | Kazakov et al. | 502/328 |
| 4,499,205 | 2/1985 | Masuda | 502/333 X |
| 4,501,823 | 2/1985 | Masuda | 502/304 |

Primary Examiner—W. J. Shine

[57] ABSTRACT

A catalyst for the production of synthesis gas or hydrogen from aqueous methanol by dissociation or steam reforming. The catalyst contains:

(A) a noble metal component of one or more elements of the Group VIII of the Periodic Table on an oxide carrier which comprises (B$_1$) TiO$_2$ and/or CeO$_2$, singly or in admixture with other thermo-resistant metal oxides and/or binders or (B$_2$) TiO$_2$ and/or CeO$_2$ on the surface of a preformed, thermo-resistant carrier and (B$_3$) ZrO$_2$ or La$_2$O$_3$ in weight concentrations of about 1 to 20% by weight.

The concentration of hydrogen or of carbon monoxide may be controlled by monitoring the concentration of steam utilized in the inlet feed.

8 Claims, No Drawings

CATALYST FOR THE PRODUCTION OF SYNTHESIS GAS OR HYDROGEN AND PROCESS FOR THE PRODUCTION OF THE CATALYST

CROSS REFERENCE TO A RELATED APPLICATION

This application is a Continuation-in-Part of our earlier application entitled CATALYST AND PROCESS FOR THE PRODUCTION OF SYNTHESIS GAS OR HYDROGEN, Ser. No. 665,757, filed Oct. 29, 1984, now U.S. Pat. No. 4,613,584.

FIELD OF THE INVENTION

This invention pertains to the production of hydrogen-rich gas mixtures from methanol. More specifically, this invention relates to an improved catalyst which may be used in the production of synthesis gas through the dissociation of methanol or in the steam reforming reaction for production of hydrogen. Still more specifically, this invention relates to a process in which one reaction may be guided to predominate over the other by adjusting the amount of steam admitted with the methanol into the reactor, but without changing the catalyst in the reactor. Still more specifically, this invention relates to a catalyst which does not promote the deposition of coke even at low steam concentrations.

BACKGROUND OF THE INVENTION

In the last few years, methanol dissociation has been devoted a growing attention. Synthesis gas, composed of about 33 vol.% $H_2$, can be obtained according to equation (1).

$$CH_3OH \rightleftharpoons CO + 2H_2 \qquad (1)$$

Reaction (1) is highly endothermic and can be carried out at temperatures over 200° C. under atmospheric or lower methanol pressure with the help of certain heterogeneous catalysts. However, with an increase of methanol conversion (over 30%), coke was laid down on the catalyst according to equations (2) and (3).

$$2CH_3OH \rightleftharpoons C + CO_2 + 4H_2 \qquad (2)$$

$$CH_3OH \rightleftharpoons C + H_2 + H_2O \qquad (3)$$

Another industrially interesting reaction is the methanol steam reforming reaction, which follows equation (4) and leads to a gas mixture of 25 vol.% $CO_2$ and 75 vol.% $H_2$.

$$CH_3OH + H_2O \rightleftharpoons CO_2 + 3H_2 \qquad (4)$$

This endothermic reaction can be considered as a combination of methanol dissociation (1) and CO-water gas shift according to equation 5.

$$CO + H_2O \rightleftharpoons CO_2 + H_2 \qquad (5)$$

DESCRIPTION OF THE PRIOR ART

Methanol reforming has, up till now, commanded a greater interest than the methanol dissociation.

DE-OS No. 33 40 569 described catalysts for the production of synthesis gas or hydrogen from water-containing methanol by dissociation or steam methanol reforming, which can be employed equally well under the conditions of methanol dissociation (equation 1) and of methanol steam reforming (equation 4), so that the process can be controlled in a simple manner by varying the water vapor content of the methanol used either toward the production of synthesis gas or toward the production of hydrogen without having to change the catalyst. These catalysts have good stability under variable process conditions and cause no coking, even without addition of steam or at low water vapor contents, i.e. under the conditions of methanol dissociation according to equation (1).

SUMMARY OF THE INVENTION

The object of the invention is, accordingly, a catalyst for the production of synthesis gas or hydrogen from aqueous methanol by dissociation or steam reforming, which is characterized by:

(A) a noble metal component of one or more elements of the Group VIII of the Periodic Table on a carrier material on the basis ($B_1$) of $TiO_2$ and/or $CeO_2$, if necessary in admixture with other refractory thermo-resistant metal oxides, and/or hydraulic binders or cements or ($B_2$) of $TiO_2$ and/or $CeO_2$ deposited on the surface of a preformed refractory carrier.

It has now been found that these catalysts can be improved with respect to their activity if certain refractory metal oxides are added.

An object of the invention, thus, is a catalyst of the above stated kind which is characterized in that the oxidic carrier ($B_1$) or respectively, the intermediate layer ($B_2$), contains as other refractory metal oxides $ZrO_2$ or $La_2O_3$ in concentrations of 1 to 10% by weight, more particularly 5 to 10% by weight.

DESCRIPTION OF THE PREFERRED EMBODIMENT

The catalyst according to the invention makes it possible to carry out the process either under the conditions of the methanol dissociation (synthesis gas production) or under the conditions of methanol steam reforming (hydrogen production), whereby only the amount of added steam is varied. The catalyst according to the invention is stable under different process conditions and does not promote coking under the conditions of methanol dissociation.

Further, the catalyst according to the invention can also be used in the presence of oxygen, thus, under conditions under which known copper catalysts are not stable. Since reactions (1) and (4) are endothermic, it is desirable in many cases, to carry out the reactions in the presence of oxygen, so that an autothermic reaction process may be achieved.

For industrial use of the catalyst according to the invention, it is advantageous for the carrier material to be in shaped forms, such as tablets, spheres, rings, or honeycombs.

For the metal component, one or more noble metals from Group VIII of the Periodic Table especially platinum and/or palladium and/or rhodium and/or iridium may be used. Alloys of these metals can also be applied.

The noble metal concentration can be held proportionally low. Preferably, the concentration is about 0.01-3 wt.%, preferably 0.05-0.3 wt.%, with reference to the total catalyst.

The concept "thermo-resistant metal oxide or refractory" is to be taken in its broadest sense and includes mixed refractory metal oxides, spinels, meral aluminates and ceramics. The substances are generally stable at temperatures up to 1000° C. Preferably, (variant $B_1$), the refractory metal oxide, is alpha-$Al_2O_3$ or $Cr_2O_3$ and (variant $B_2$), the preformed refractory support, is cordierite, mullite, silicon carbide or alpha-$Al_2O_3$.

The hydraulic binder is preferably Portland or calcium aluminate cement and is present in a concentration of about 5 to 50% by weight, preferably 15 to 25% by weight, based on the weight of the total catalyst.

Another object of this invention is a process for the production of the catalyst. According to variant ($B_1$), shaped bodies are produced by pressing or extruding $TiO_2$ and/or $Ce_2$, if necessary in admixture with $ZrO_2$ or $Al_2O_3$. They are calcined and impregnated with the noble metal component. Preferably, the hydraulic binder is added to the $TiO_2$ and/or $CeO_2$. Subsequently, water is added to the mixture, to activate the hydraulic binder, whereupon shaped bodies are produced by pressing. These are dried, if necessary hardened with steam, calcined, and impregnated with the noble metal component.

In order to facilitate pressing, a lubricant, such as aluminum stearate and/or graphite, is added to the mass to be pressed or extruded.

According to variant ($B_2$), $TiO_2$ and/or $Ce_2O_3$ and then $ZrO_2$ and/or $LaO_3$ is deposited on the surface of a preformed, "inert" refractory or heat-resistant material (e.g., alpha $Al_2O_3$, or ceramic); whereupon the so-treated shaped body is calcined and impregnated with the noble metal component. Preformed refractory ceramics include ceramic honeycombs in normal commercial usage, which excel in high strength and stability. The ceramic material includes cordierite or mullite. However, commercially available ceramic spheres and rings can also be used as preformed shaped bodies.

In order to improve the adhesion of titanium dioxide on the preformed shaped refractories, the shaped refractories are preferably impregnated with alkoxytitanates, such as tetraisopropyltitanate (($CH_3)_2CHO)_4Ti$) or tetra-n-butyltitanate ((n—$C_4H_8O)_4Ti$). The alkoxytitanates are thereafter hydrolyzed with steam and calcined.

According to both process variants, the impregnation of the carrier material with the metal component is carried out with the use of water soluble precious metal salts, especially $H_2PtCl_6$ or $(NH_4)_2PtCl_6$ or the corresponding Pd—or Rh—or Ir—salts. The so-produced catalyst precursor is then dried and calcined. The calcination of the impregnated carrier material is usually carried out at 450°-650° C., preferably at 550°-600° C.

In order to obtain the corresponding noble metals from the noble metal salts, the calcined catalyst precursor is activated by reduction with hydrogen, which may be obtained by methanol dissociation or by steam reforming, depending on the steam concentration of vaporized methanol. The reduction or activation can be done immediately after the calcination or in the reactor before start-up.

The subject of the invention is also the use of the previously described catalysts for the production of synthesis gas or hydrogen from aqueous methanol by dissociation or steam reforming. As is evident from equations (1) and (4), dissociation of methanol takes place in the absence of steam, while steam reforming according to equation (4) takes place in the presence of steam. Depending on the water content of the methanol, the process can be simply guided so that either one or the other reaction predominates. If pure hydrogen, according to equation (4), or a synthesis gas with an excess of hydrogen is to be produced, the carbon dioxide formed according to equation (4) is removed from the gas mixture in a known manner.

In general, the conversion of the aqueous methanol takes place in the temperature range of about 300°-600° C., at a pressure of from 0.1 to 10 bar and at a space velocity of 0.5-20 liters of aqueous methanol per hour and liter of catalyst. Preferably the conversion is carried out in the temperature range of 400°-500° C. at pressures of 0.1-1 bar, preferably 0.75-1 bar, starting from methanol with a water content of 0.5-25 vol.%, preferably 2-10 vol.% and at a space velocity of 2-8 liters of aqueous methanol per hour and liter of catalyst.

The trials given in the following exampes were carried out in a conventional metal tubular reactor (fixed bed flow system) with tableted (4×4 mm) catalyst (50 ml) or with ceramic honeycombs (diameter 17 mm, length 150 mm) at atmospheric pressure in the temperature range of 300°-500° C.

The invention is explained by the following examples:

EXAMPLE 1

A commercial $TiO_2$(BET-surface area=45 m²/g) was mixed with a commercial $La_2O_3$ (BET-surface area=25 m²/g) weight ratio 9:1) for about 30 minutes in a mix muller. After addition of 8% by weight Al stearate, the mixture was tableted into 4.5×4.5 mm tablets and the tablets were calcined in air at 640° C. for 8 hours, then held at 640° C. for 1 hour and thereafter cooled to ambient temperature.

After impregnation with an aqueous $H_2PtCl_6$ solution (at 25° C.), the Pt-containing tablets were dried (120° C., 4h) and recalcined at 400° C. (2h).

The catalyst (K-1) thus obtained contained 0.3% by weight Pt; its physical-mechanical data are compiled in Table I.

EXAMPLE 2

The procedure of Example 1 was repeated, except $ZrO_2$ was substituted for $La_2O_3$. The physical-mechanical data of the catalyst (K-2) thus obtained are complied in Table I.

TABLE I

Physical-Mechanical Data of the Catalysts Produced

| Cat. # | Size | BET-SA ($M^2$/g) | BD (g/l) | CS (kg) | PV (ml/g) | Composition (+) (% by wt.) |
|---|---|---|---|---|---|---|
| K-1 | 4.5 × 4.5 mm tablet | 35 | 1350 | 16.0 | 0.12 | $TiO_2$ (88), $La_2O_3$ (10) |
| K-2 | 4.5 × 4.5 mm tablet | 37 | 1400 | 16.0 | 0.13 | $TiO_3$ (88), $ZrO_2$ (10) |

Notes:
BET-SA = BET specific surface area
BD = Bulk density
CS = Crush strength
PV = Pore volume
(+) All prepared catalysts contain 0.3% by weight Pt The catalysts obtained according to Examples 1 and 2 were heated to 400° C. in streaming hydrogen over a period of 3 hours to reduce the noble metal component. After the cooling to 300° C., the methanol dissociation was begun in a conventional metal tube reactor. The methanol contained 2.2% by volume $H_2O$. The methanol dissociation was carried out at a space velocity of 2 liters per hour and liter of catalyst at 300°, 350° and 400° C.

The results are summarized in Table II.

Many modifications will occur to those skilled in the art from the detailed description hereinabove given, which are meant to be exemplary in nature and nonlimiting, except to be commensurate in scope with the appended claims.

TABLE II

| Cat. # | T °C. | Gas Quantity lt/h (25° C.) | Gas Composition (% by vol.) | | | | Methanol Conversion (%) |
|---|---|---|---|---|---|---|---|
| | | | CO | $H_2$ | $CO_2$ | $CH_2$ | |
| K-1 | 300 | 74 | 26.1 | 68.8 | 3.7 | 1.4 | 40.8 |
| | 350 | 146 | 28.5 | 67.1 | 3.0 | 1.4 | 80.6 |
| | 400 | 180 | 28.8 | 66.5 | 3.0 | 1.7 | 99.3 |
| K-2 | 300 | 74 | 25.8 | 68.0 | 3.6 | 2.6 | 40.0 |
| | 350 | 146 | 28.3 | 66.5 | 3.1 | 2.1 | 79.5 |
| | 400 | 180 | 28.6 | 66.1 | 2.9 | 2.4 | 98.7 |

Charge: Methanol containing 2.2% by vol. $H_2O$

We claim:

1. A catalyst for the production of synthesis gas or hydrogen from aqueous methanol, which comprises:
   A. a catalytically-active, Group VIII noble metal component;
   B. a carrier material consisting essentially of:
      1. at least one metal oxide, wherein the metal is selected from the group consisting of cerium and titanium, and
      2. from 1–10% by weight of an oxide of zirconium or lanthanum.

2. A catalyst, as defined in claim 1, in which the metal oxide is admixed with a hydraulic cement.

3. A catalyst, as defined in claim 1, in which the noble metal component is selected from the group consisting of platinum, rhodium, iridium and palladium.

4. A catalyst, as defined in claim 1, in which the concentration of the noble metal component is present in a weight concentration, in reference to the total catalyst, of from about 0.01 to 3% by weight.

5. A catalyst, as defined in claim 2, in which the hydraulic cement is Portland or calcium aluminate cement in a concentration by weight of from 5 to 50% of the total catalyst.

6. A process for the production of the catalyst of claim 1, which consists essentially of the steps of:
   A. forming shaped bodies from at least one metal oxide, selected from a group consisting of titanium and cerium oxides and a metal oxide, selected from the group consisting of zirconium and lanthanum oxides,
   B. calcining said shaped bodies,
   C. impregnating said tablets with a solution of a soluble group VIII noble metal compound, and
   D. calcining said impregnated shaped bodies.

7. A process for producing the catalyst, as defined in claim 6, in which a mixture of a metal oxide selected from the group consisting of titanium and cerium oxides and a metal oxide selected from the group consisting of zirconium and lanthanum oxides
   A. is admixed with a hydraulic cement,
   B. water is added to said mixture, and
   C. the damp admixture is formed into shaped bodies.

8. A process, as defined in claim 7, the improvement of adding a lubricant to the admixture prior to forming the admixture into shaped bodies.

* * * * *